United States Patent
Kang (10) Patent No.: US 11,840,192 B2
(45) Date of Patent: Dec. 12, 2023

(54) PANORAMIC WINDOW SAFETY SYSTEM AND VEHICLE HAVING THE SAME

(71) Applicants: Hyundai Motor Company, Seoul (KR); Kia Corporation, Seoul (KR)

(72) Inventor: Seung-Kyu Kang, Hwaseong-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/747,663

(22) Filed: May 18, 2022

(65) Prior Publication Data
US 2023/0063413 A1 Mar. 2, 2023

(30) Foreign Application Priority Data
Aug. 26, 2021 (KR) .................. 10-2021-0113067

(51) Int. Cl.
| | | |
|---|---|---|
| *B60R 21/2334* | (2011.01) | |
| *B60R 21/232* | (2011.01) | |
| *B60R 21/231* | (2011.01) | |
| *B60R 21/0136* | (2006.01) | |

(52) U.S. Cl.
CPC ...... *B60R 21/2334* (2013.01); *B60R 21/0136* (2013.01); *B60R 21/232* (2013.01); *B60R 21/23138* (2013.01)

(58) Field of Classification Search
CPC ............ B60R 21/232; B60R 21/23138; B60R 21/2334; B60R 21/0136
See application file for complete search history.

(56) References Cited

U.S. PATENT DOCUMENTS

| | | | | |
|---|---|---|---|---|
| 5,324,072 A | * | 6/1994 | Olson | B60R 21/21 280/730.2 |
| 5,752,713 A | * | 5/1998 | Matsuura | B60R 21/23138 280/730.2 |
| 6,168,194 B1 | * | 1/2001 | Cuevas | B60R 21/2644 280/736 |
| 6,375,216 B1 | * | 4/2002 | Eschbach | B60R 21/2338 280/730.2 |
| 6,398,254 B2 | * | 6/2002 | David | B60R 21/23138 280/730.2 |

(Continued)

FOREIGN PATENT DOCUMENTS

| | | | | |
|---|---|---|---|---|
| GB | 2369091 A | * | 5/2002 | ........... B60R 21/232 |
| KR | 19990058489 A | * | 7/1999 | |
| KR | 10-2009-0030553 A | | 3/2009 | |

*Primary Examiner* — Faye M Fleming
(74) *Attorney, Agent, or Firm* — MORGAN, LEWIS & BOCKIUS LLP (57) ABSTRACT

A panoramic window safety system applied to a vehicle moves a piston in a piston movement space of a piston carriage by a gas pressure of an inflator located on the bottom portion of a panoramic window space, and switches a wire that forms a side bending arrangement in the panoramic window space into an intermediate linear arrangement by a forward movement of the piston to be stood perpendicular to the panoramic window space to support an airbag covering the panoramic window space, preventing the risk of a passenger leaving when a panoramic window having the size at which the upper body of a passenger is exposed is damaged to meet the North American regulations that prescribe preventing the passenger from leaving.

19 Claims, 9 Drawing Sheets

(56) References Cited

U.S. PATENT DOCUMENTS

| | | | | |
|---|---|---|---|---|
| 6,676,154 B2* | 1/2004 | Fischer | ................ | B60R 21/232 |
| | | | | 280/730.2 |
| 10,525,925 B2* | 1/2020 | Deng | ................ | B60R 21/2165 |
| 11,541,837 B2* | 1/2023 | Lee | ........................ | B60N 2/753 |
| 2005/0173901 A1* | 8/2005 | Wu | ........................ | B60R 21/08 |
| | | | | 280/730.2 |
| 2007/0084128 A1* | 4/2007 | Recknagel | .......... | B60R 21/0136 |
| | | | | 49/502 |
| 2021/0253055 A1* | 8/2021 | Fischer | .................. | B60R 21/21 |
| 2023/0021237 A1* | 1/2023 | Kang | ................ | B60R 21/2338 |

* cited by examiner

<CROSS-SECTION B-B>

(VEHICLE OUTDOOR)   (VEHICLE INDOOR)

PANORAMIC WINDOW SAFETY SYSTEM AND VEHICLE HAVING THE SAME

CROSS-REFERENCE TO RELATED APPLICATION

The present application claims priority to Korean Patent Application No. 10-2021-0113067, filed on Aug. 26, 2021, the entire contents of which is incorporated herein for all purposes by this reference.

BACKGROUND OF THE PRESENT DISCLOSURE

Field of the Present Disclosure

The present disclosure relates to a panoramic window, and in particular, to a vehicle to which a panoramic window safety system that prevents the risk of a passenger leaving through a panoramic window space to which the upper body of the passenger is exposed even upon collision is applied.

Description of Related Art

Recently, a vehicle is being developed to a purpose built vehicle (PBV). In the instant case, the PBV refers to an autonomous ground mobility which is changed into various forms and functions depending upon the use, the applications, and the purpose.

For example, the PBV applies a panoramic window, and the panoramic window forms a side surface of the vehicle with a window region in which the upper body of a passenger is exposed to a glass surface.

Therefore, the panoramic window provides the external view with increased indoor openness and visibility to the passenger through the wide glass surface of the window.

However, the panoramic window has difficulty in meeting the North American regulations that prescribe preventing the passenger from leaving when the passenger does not wear the seat belt because the upper body of the passenger is exposed to the glass surface of the panoramic window. In the instant case, the North American regulations that prescribe preventing the passenger from leaving prescribe that the passenger should not bounce out of the window through the glass surface upon collision (in particular, side collision) of the vehicle in the vehicle to which the panoramic window is applied, such as a PBW.

The panoramic window can inevitably have a fundamental problem in that a CAB and a side airbag (SAB) that are airbag devices for protecting the passenger cannot be used for preventing the passenger from leaving.

Such a reason is because when the window structure applied to a general vehicle (i.e., a vehicle to which the PBW concept is not applied) other than the PBW collides with a low window height and a high vehicle body and trim structure, the CAB can support the head area of the passenger in a state where the SAB is supported by a trim, preventing the passenger from leaving, but on the other hand, the panoramic window can inevitably provide an insufficient passenger restriction reaction force in a state where the SAB is not supported due to the trim structure in height lower than that of the window structure of the general vehicle and cannot restrict the passenger with only the CAB on which an excessive passenger leaving load acts.

The information included in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a panoramic window safety system and a vehicle having the same, which can prevent the risk of a passenger leaving due to collision using a window glass having the size at which the upper body of the passenger is exposed, meeting the North American regulations that prescribe preventing the passenger from leaving, and can prevent the risk of the passenger leaving through a passenger leaving load reaction force generated by a CAB, protecting the passenger using the CAB and a SAB even in the panoramic window.

A panoramic window safety system according to an exemplary embodiment of the present disclosure for achieving the object includes a panoramic door formed with a panoramic window space; an inflator module provided with an inflator located on a bottom portion of the panoramic window space; and a wire module provided with a wire which is located on one side of the panoramic window space in a side bending arrangement, and provided perpendicular to the panoramic window space by switching of the side bending arrangement into an intermediate linear arrangement by a gas pressure of the inflator.

As an exemplary embodiment of the present disclosure, the wire is a steel wire or a wire made of a material that withstands a high temperature of 700° C. or more.

As the exemplary embodiment of the present disclosure, the inflator module includes a piston carriage configured to communicate the inflator in a hollow structure of a piston movement space, to move a piston fixing the wire in the piston window space by the gas pressure, and to pull the wire by the movement of the piston to switch the side bending arrangement into the intermediate linear arrangement and a mounting bracket fixing the piston carriage to the panoramic door.

As the exemplary embodiment of the present disclosure, the piston carriage forms a pressure chamber in which the piston movement space of the piston carriage is partitioned at a front location of the piston, and the inflator includes a first inflator configured to communicate with the pressure chamber at the front location of the piston, and a second inflator configured to communicate with the piston movement space at a rear location of the piston.

As the exemplary embodiment of the present disclosure, the first inflator and the second inflator explode with time difference therebetween to generate the gas pressure of the first inflator and the second inflator, respectively.

As the exemplary embodiment of the present disclosure, the pressure chamber is provided with a chamber partition wall configured to block the gas from backflowing due to the explosion of the first inflator, and the chamber partition wall is formed to be slanted with respect to a longitudinal axis of the piston carriage in the piston movement space of the piston carriage.

As the exemplary embodiment of the present disclosure, the piston carriage is provided with a wire guide through which the wire exits, and the wire guide communicates with an expansion chamber formed in front of the chamber partition wall partitioning the pressure chamber, and forms a path through which the wire exiting the piston to pass through the chamber partition wall exits.

As the exemplary embodiment of the present disclosure, a wire hole configured to penetrate the wire is perforated in the piston.

As the exemplary embodiment of the present disclosure, the wire module includes a wire holder configured to support the wire, and the wire holder is formed in the side bending arrangement in combination of a first wire holder, a second wire holder, a third wire holder, and a fourth wire holder.

As the exemplary embodiment of the present disclosure, each of the first wire holder and the fourth wire holder is fixed to the panoramic door in a bolting fastening structure, and each of the second wire holder and the third wire holder is fixed to the panoramic door in a fastener fitting structure.

As the exemplary embodiment of the present disclosure, the first wire holder and the fourth wire holder face each other and are arranged on the top portion and bottom portion of the panoramic window space at an intermediate location of the panoramic window space, and the second wire holder and the third wire holder face each other and are arranged on the top portion and bottom portion of the panoramic window space at on an external location of the panoramic window space.

As the exemplary embodiment of the present disclosure, the second wire holder and the third wire holder are damaged by the movement of the wire due to the gas pressure in a state where the wire is fixed to the fourth wire holder, and the first wire holder and the fourth wire holder maintain the wire in the intermediate linear arrangement.

As the exemplary embodiment of the present disclosure, the fourth wire holder and the wire are fixed by a wire end portion, and the wire end portion is latched to a bolting type body of the fourth wire holder with a ring structure.

As the exemplary embodiment of the present disclosure, the fourth wire holder is surrounded by a holder cover.

As the exemplary embodiment of the present disclosure, the inflator is connected to a controller, and the controller is configured to control the inflator with a first inflator signal according to a time to fire (TTF) of an airbag and a second inflator signal after the timing of the TTF.

As the exemplary embodiment of the present disclosure, the airbag is deployed to the panoramic window space, and the wire generates a passenger leaving load reaction force for the airbag in the intermediate linear arrangement between the airbag and the panoramic window space.

Furthermore, a vehicle according to an exemplary embodiment of the present disclosure for achieving the object includes a panoramic door formed with a panoramic window space to which a panoramic window is coupled; an airbag deployed toward the panoramic window upon collision of the vehicle; a panoramic window safety system configured to move a piston in a piston movement space of a piston carriage by gas pressures of a first inflator and a second inflator located on the bottom portion of the panoramic window space, and to switch a wire that forms a side bending arrangement in the panoramic window space into an intermediate linear arrangement by a forward movement of the piston to be stood perpendicular to the panoramic window space to support the airbag covering the panoramic window space; and a controller configured to monitor a collision signal of a collision detector and to control the explosion of the first inflator and the second inflator with time difference of the timing when confirming the collision signal.

As an exemplary embodiment of the present disclosure, the time difference of the timing is based on a time to fire (TTF) of the airbag, and the first inflator applies the same timing as that of the TTF whereas the second inflator applies a delay timing after the timing of the TTF.

As the exemplary embodiment of the present disclosure, the airbag is a curtain airbag (CAB) or a side airbag (SAB).

The panoramic window safety system applied to the vehicle according to an exemplary embodiment of the present disclosure implements the following operations and effects.

First, it is very easy to develop the concept to which the panoramic window is applied in the vehicle, the purpose built vehicle (PBV) and the PBV type autonomous vehicle by strengthening the passenger's safety by the panoramic window safety system. Second, it is possible to actively use the CAB and the SAB for protecting the passenger like the window structure of the general vehicle (i.e., vehicle to which the PBW concept is not applied) upon collision, e.g., side collision of the vehicle. Third, it is possible to easily implement the panoramic window safety system using the door or the panel portion of the vehicle body using the additional mounting point of the CAB for generating the passenger leaving load reaction force of the CAB that prevents the passenger from leaving due to collision. Fourth, the passenger leaving load reaction force of the CAB is generated by the CAB wiring support structure, minimizing the passenger's behavior of leaving to the outside of the room. Therefore, it is possible to significantly improve the safety of the passenger seated on the panoramic window side of the PBV, the PBV type autonomous vehicle in the collision situation. Fifth, the passenger leaving load reaction force can be generated by the 2-step inflator operation of the CAB under a control of the airbag control unit (ACU) to reduce the necessary strength of the system structure, such as the piston carriage/the wire, compared to using one high powder inflator, saving the cost. Sixth, the PBV to which the panoramic window is applied can satisfy the North American regulations that prescribe preventing the passenger from leaving, enhancing the merchantability of the vehicle for the consumer in North American markets.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, an exemplary embodiment of the present disclosure will be described in detail with reference to the accompanying exemplary drawings, and the exemplary embodiment of the present disclosure is an example and may be implemented in various different forms by those skilled in the art to which the present disclosure pertains, and therefore, is not limited to the exemplary embodiment described herein.

Figure 1:
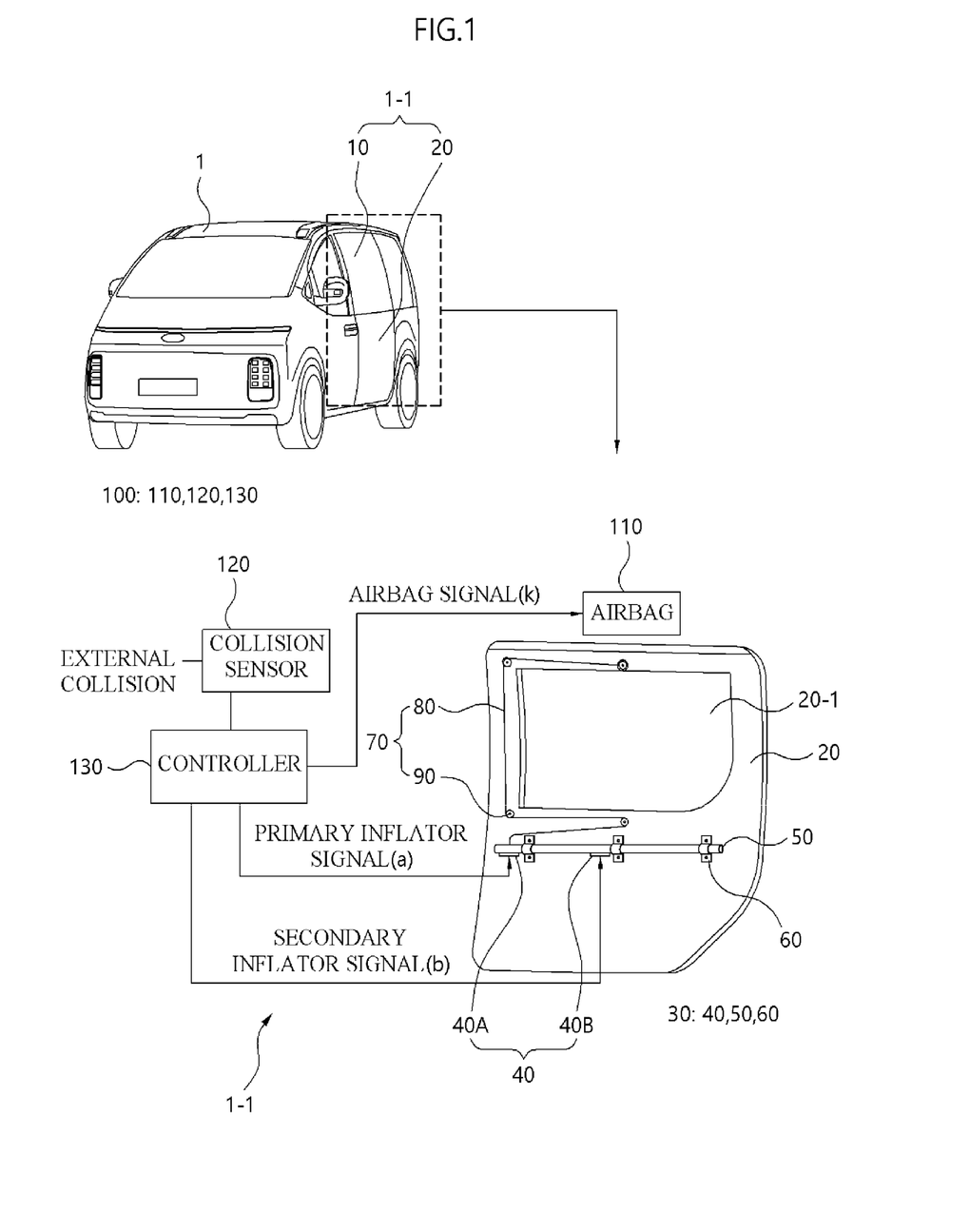
FIG. 1 is a schematic diagram of a panoramic window safety system applied to a vehicle according to an exemplary embodiment of the present disclosure.

Referring to FIG. 1, a vehicle 1 is provided with a panoramic window safety system 1-1 on a panoramic window 10 formed as a side surface of a vehicle. In the instant case, the vehicle is a purpose built vehicle (PBV), and is a PBV type autonomous vehicle.

The panoramic window safety system 1-1 operates a wire module 70 with tension generated therein together with the inflation of an airbag 110 to provide a passenger leaving load reaction force to the airbag 110 receiving the shock applied by a passenger 200 (see FIG. 9), preventing a risk of the passenger 200 (see FIG. 9) leaving due to the side collision in a state where a window glass of the panoramic window 10 is damaged using the airbag 110 to satisfy the North American regulations that prescribe preventing the passenger from leaving.

The panoramic window safety system 1-1 includes a panoramic door 20, an inflator module 30, and a wire module 70, and connected to an airbag system 100 to be interlocked with an operation of the airbag 110 which is deployed toward a panoramic window space 20-1 of a window frame 20 to protect the passenger 200 (see FIG. 9) from the side collision.

For example, the panoramic door 20 is a thin plate and formed of a door body formed of a component mounting internal panel while forming a door internal space with internal and external panels, and the door body is formed with the panoramic window space 20-1 in an upper section thereof and therefore, is coupled to the window glass to form the panoramic window 10.

Therefore, the panoramic door 20 is formed in the same structure as the door applied to a general vehicle, and there is a difference in that the panoramic window space 20-1 is formed in the size that matches with the size of the panoramic window 10 other than the window of a general door.

For example, the inflator module 30 includes an inflator 40, a piston carriage 50, and a mounting bracket 60.

The piston carriage 50 is provided horizontally across a width of the door body (e.g., the internal panel or the external panel) of the panoramic door 20 in a transverse arrangement (or horizontal arrangement) in the door internal space of the panoramic door 20, the mounting bracket 60 is fixed to the door body by a screw or welding to fix the piston carriage 50, and the inflator 40 is coupled to the piston carriage 50 to form a gas pressure in a pressure chamber 53 (see FIG. 2) of the piston carriage 50.

To the present end, the inflator 40 includes a pair of first inflator 40A and second inflator 40B, and operated in the order that the second inflator 40B explodes after the first inflator 40A explodes.

For example, the wire module 70 includes a wire 80 and a wire holder 90. In the instant case, the wire holder 90 is fixed to the door body of the panoramic door 20 and located on the peripheral border of the panoramic window space 20-1, and the wire 80 is latched to the wire holder 90 to maintain a constant tension and located on one side of the door body along the peripheral border of the panoramic window space 20-1 of the panoramic door 20.

To the present end, the wire 80 is formed of a steel wire of a predetermined diameter with sufficient stiffness to withstand the shock applied by the passenger 200 (see FIG. 9) or made of a material to withstand the high temperature of 700° C. or more, and has a wire end portion 80A (see FIG. 6 and FIG. 7) formed in a ring structure on the end portion thereof. In the instant case, the diameter of the steel wire is applied differently depending upon the shock load to withstand the shock applied by the passenger 200 (see FIG. 9).

Furthermore, a plurality of wire holders 90 are formed and arranged in a "⌐" shape (or side bending shape) on the peripheral border of the panoramic window space 20-1 so that the wire 80 can maintain the constant tension in the "⌐" shape (or side bending shape).

For example, the airbag system 100 includes the airbag 110, a collision detector 120, and a controller 130. In the instant case, the airbag 110 is a curtain airbag (CAB) or a side airbag (SAB).

The airbag 110 is embedded in a ceiling portion of the vehicle 1 or a trim portion formed as the ceiling, and the deployment direction thereof heads to downward to cover the panoramic window space 20-1 from the top portion of the panoramic door 20. Furthermore, the controller 130 continuously monitors a collision signal of the collision detector 120 configured to detect external collision (e.g., side collision) of the vehicle 1.

Therefore, the airbag 110, the collision detector 120, and the controller 130 are components forming the airbag system applied to the general vehicle.

To the present end, as the controller 130, an airbag control unit (ACU) configured to control any one of the curtain airbag (CAB), the side airbag (SAB), a driver airbag (DAB), a passenger airbag (PAB), and a knee airbag (KAB) may be applied.

However, there is a difference in that the controller 130 recognizes the collision signal of the collision detector 120 to deploy the airbag 110 with an airbag signal (k) and at the same time, outputs a secondary inflator signal (b) for the second inflator 40B after outputting a primary inflator signal (a) for the first inflator 40A of the inflator 40, and a logic or a program for such an operation is stored in a memory.

Figure 2:
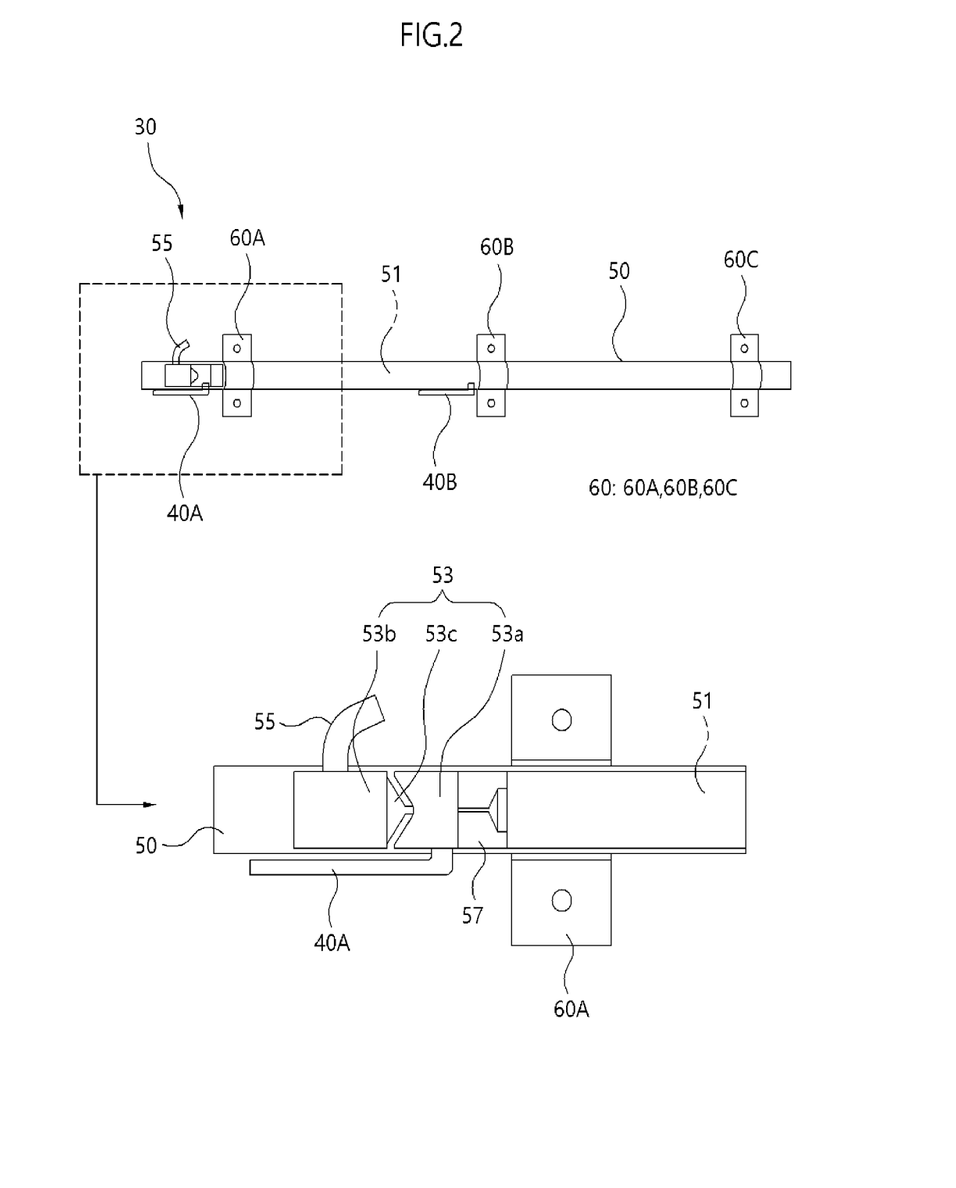
FIG. 2 is a diagram showing a state where an inflator, a piston carriage, and a mounting bracket forming an inflator module according to an exemplary embodiment of the present disclosure are assembled.
Figure 3:
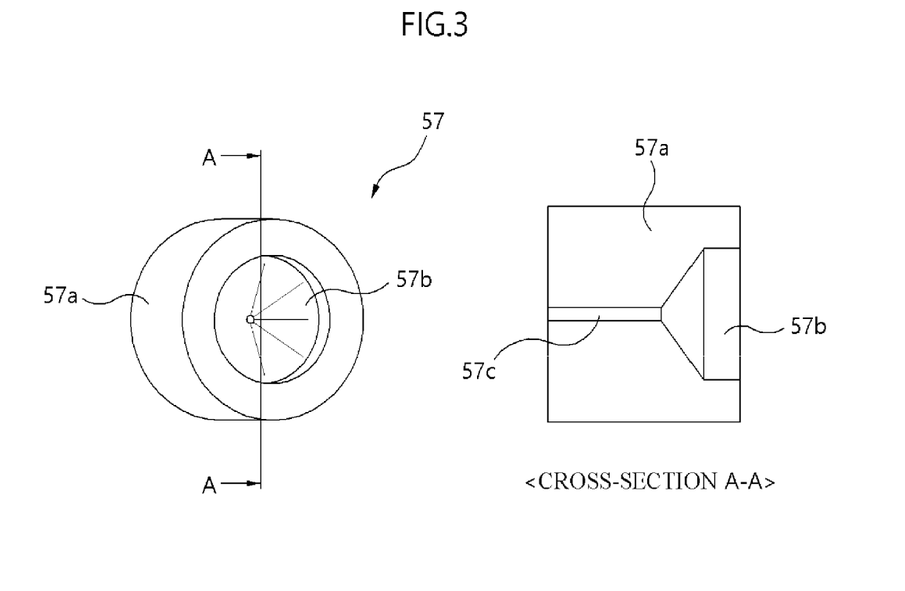
FIG. 3 is a diagram showing a structure of a piston forming the piston carriage according to an exemplary embodiment of the present disclosure.

Meanwhile, FIG. 2 and FIG. 3 show a specific configuration of the inflator module 30.

Referring to FIG. 2, the inflator module 30 includes the inflator 40 including the pair of first and second inflators 40A, 40B, the piston carriage 50, and the mounting bracket 60 including a pair of first, second, and third mounting brackets 60A, 60B, and 60C.

For example, each of the first and second inflators 40A, 40B includes the same components. However, the first inflator 40A is located to communicate with the pressure chamber 53 in a front section of the piston carriage 50 and explodes with the primary inflator signal (a) to send a gas to the pressure chamber 53 of the piston carriage 50 to increase a pressure of an internal space of the pressure chamber.

Furthermore, the second inflator 40B is located to communicate with a piston movement space 51 of the piston carriage 50 in an intermediate section of the piston carriage 50 and explodes with the secondary inflator signal (b) to send the gas to the piston movement space 51 of the piston carriage 50 to increase a pressure of the piston movement space.

Therefore, the first and second inflators 40A, 40B are located in the front and intermediate sections of the piston carriage 50. In the instant case, the first mounting bracket 60A of the mounting bracket 60 is located in the front section, and the second mounting bracket 60B of the mounting bracket 60 is located in the intermediate section.

As described above, the present disclosure can provide the advantage that can reduce the necessary strength required for the system structure, such as the piston carriage 50 and the wire 80, according to the use of one high powder inflator using two first and second inflators 40A, 40B.

For example, the piston carriage 50 is formed in a hollow structure that has one end portion closed and the other end portion formed with the piston movement space 51 in an open structure. The entire length of the piston carriage 50 may be supported by three first, second, and third mounting brackets 60A, 60B, and 60C, maintaining the stably fixed state in a state where the gas pressure generated by the two first and second inflators 40A, 40B acts.

For example, the first mounting bracket 60A of the first, second, and third mounting brackets 60A, 60B, and 60C is located close to the first inflator 40A on the pressure chamber 53 side to fix the front section of the piston carriage 50, the second mounting bracket 60B is located close to the second inflator 40B to fix the intermediate section of the piston carriage 50, and the third mounting bracket 60C is located close to a piston stopper 50A (see FIG. 7) side to fix the rear section of the piston carriage 50.

Furthermore, the piston carriage 50 is provided with the pressure chamber 53 and a wire guide 55 on one end portion of the sealed structure, and a piston 57 is embedded in the piston movement space 51.

For example, the pressure chamber 53 forms the front section of the piston carriage 50 closed by the end wall and the piston 57 in the sealed structure of the piston movement space 51, and is connected to the first inflator 40A to serve as the pressure chamber filled with the gas pressure of the first inflator 40A so that the piston 57 moves forward in the piston movement space 51 of the piston carriage 50.

To the present end, the pressure chamber 53 includes an explosion chamber 53a and an expansion chamber 53b partitioned by a chamber partition wall 53c. In the instant case, the explosion chamber 53a forms a closed space closed by the chamber partition wall 53c and the piston 57 to communicate with a gas outlet of the first inflator 40A, the expansion chamber 53b forms a closed space closed by the chamber partition wall 53c and the sealed wall of the piston carriage 50 to communicate with the wire guide 55, and the chamber partition wall 53c is formed in an oblique structure integrated with an internal diameter of the piston movement space 51 of the piston carriage 50 to prevent the explosion gas of the explosion chamber 53a from backflowing, facilitating the piston 57 that fully receives the gas pressure to move forward in the piston movement space 51.

The expansion chamber 53b is formed with a wire drawn-out path through which the wire 80 passing through the piston 57 and the chamber partition wall 53c exits to the wire guide 55, and the chamber partition wall 53c is formed with a central hole through which the wire 80 is provided to penetrate.

For example, the wire guide 55 is formed of a hollow pipe to communicate with the expansion chamber 53b to form the drawn-out path through which the wire 80 exits the piston movement space 51 of the piston carriage 50.

The wire guide 55 is formed in a bending structure, and the bending structure is inclined toward the rear of the piston carriage 50 (i.e., toward the piston stopper 50A in FIG. 7) so that the wire 80 is coupled to the wire holder 90 in the intermediate section (i.e., location of the second mounting bracket 60B) of the piston carriage 50.

Figure 6:
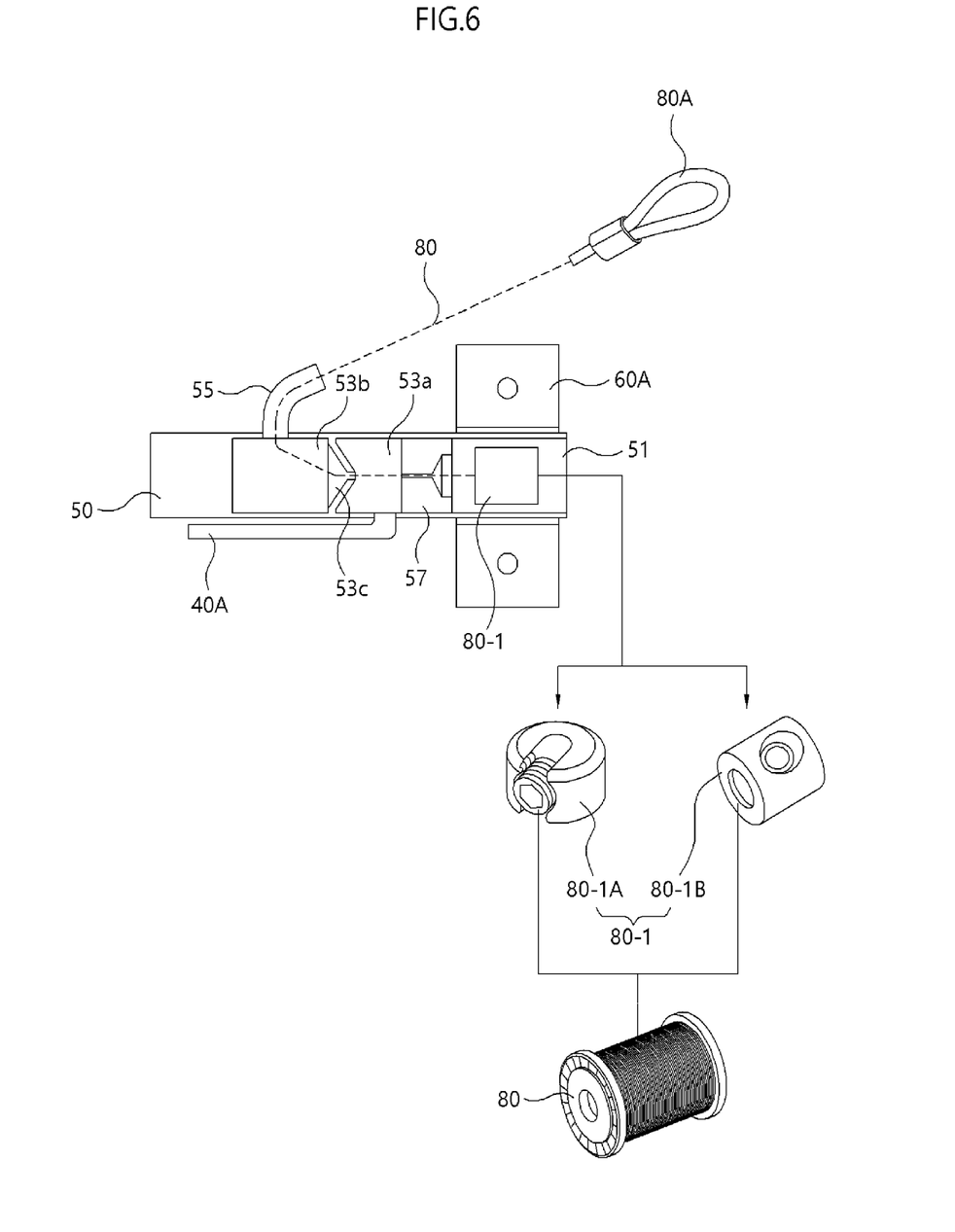
FIG. 6 is a diagram showing a state where the wire of the wire module according to an exemplary embodiment of the present disclosure forms a wire drawn-out path.
Figure 7:
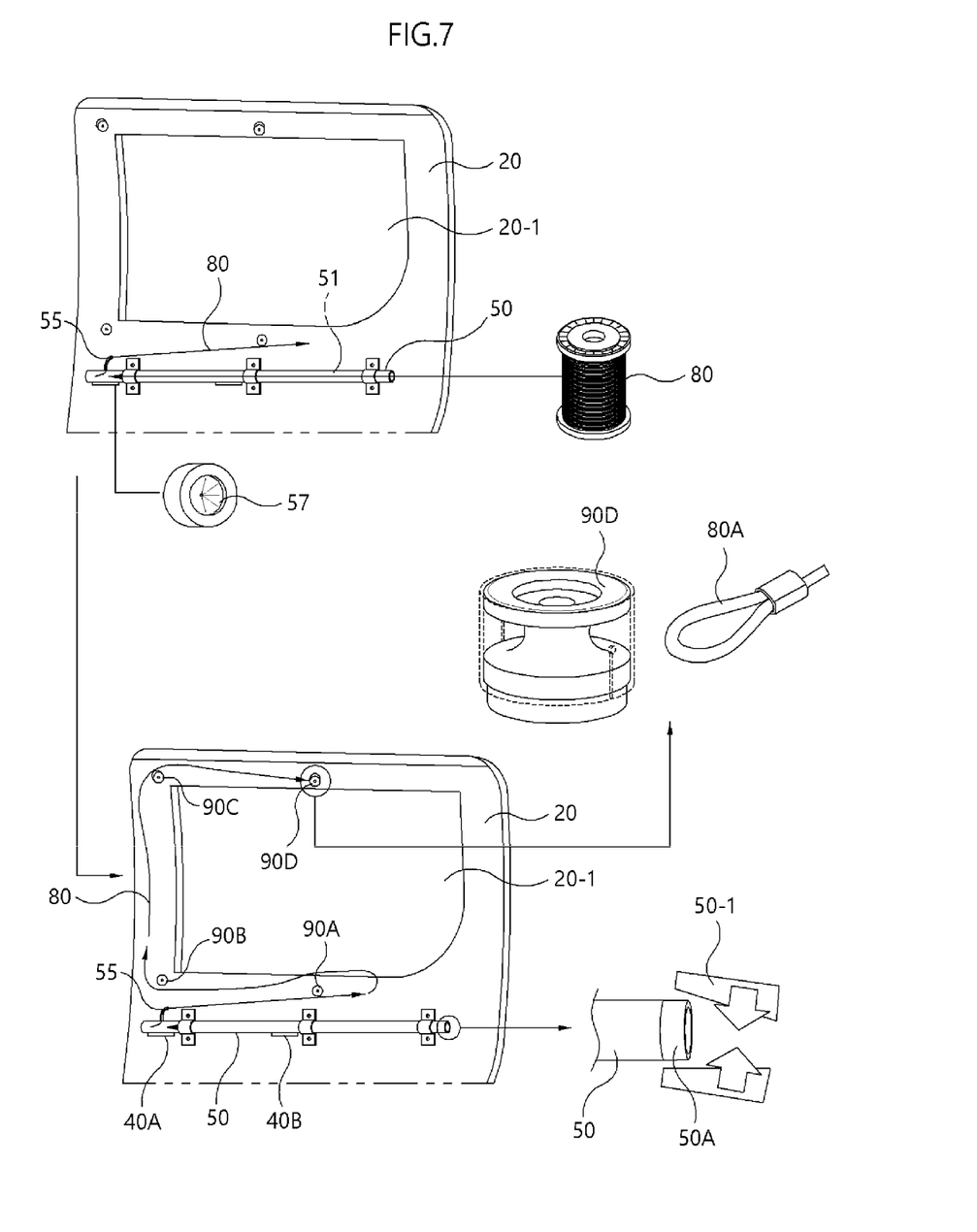
FIG. 7 is a diagram showing a pre-operation state where the wire according to an exemplary embodiment of the present disclosure is set and arranged in a wire installation path connected after the wire drawn-out path.

For example, the piston 57 closes the pressure chamber 53 in the piston movement space 51 of the piston carriage 50 to divide the piston movement space 51 into the front section of the pressure chamber 53 and the rear section of the piston stopper 50A (see FIG. 6 and FIG. 7).

Therefore, the piston 57 moves in the piston movement space 51 of the piston carriage 50 from forward to backward by inducing the continuous forward motion of the piston due to the gas pressure sequentially generated by the two first and second inflators 40A, 40B. In the instant case, the front of the forward motion of the piston refers to the pressure chamber 53 side, and the rear thereof refers to the piston stopper 50A (see FIG. 7) side thereof.

Referring to FIG. 3, the piston 57 is formed of a piston body 57a of a cylindrical body, and the piston body 57a is coupled to a wire clamp 80-1 using a piston groove 57b formed in the front surface of the piston, a wire hole 57c is perforated in the center portion of the piston groove 57b to penetrate the piston body 57a, and therefore, the wire 80 may be fitted into the wire hole 57c from the piston groove 57b side to penetrate the piston body 57a.

The diameter of the piston 57 may be applied in the size finely smaller than or the same size as the internal diameter of the piston movement space 51 to minimize the friction resistance in a process in which the piston 57 moves in the piston movement space 51 of the piston carriage 50 by the gas pressure. In the instant case, when the piston 57 and the piston movement space 51 have the same diameter, it is possible to reduce a friction force with the degree of processing for an external circumferential surface of the piston 57 or an internal circumferential surface of the piston movement space 51.

Figure 4:
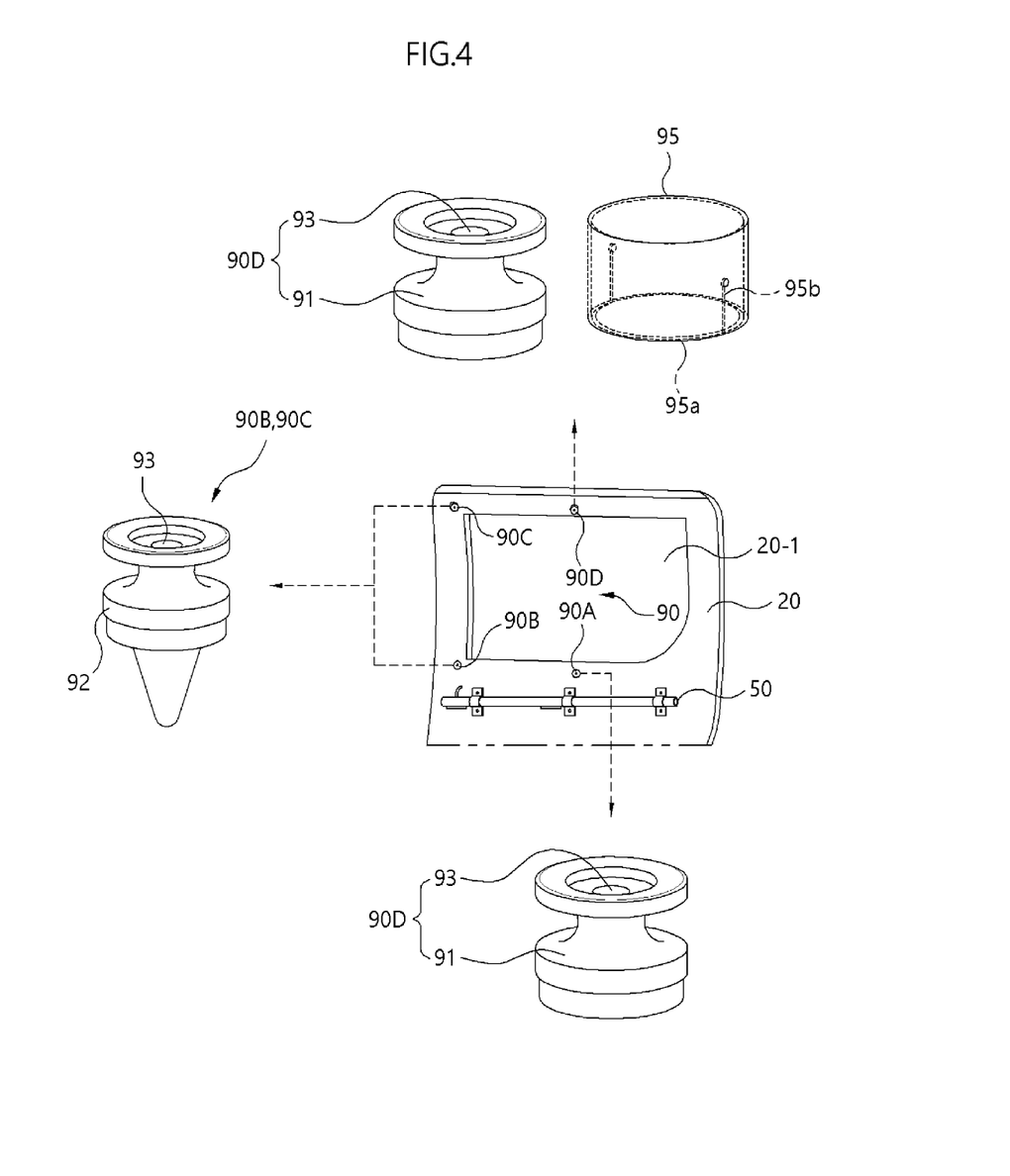
FIG. 4 is a diagram showing an example of forming first, second, third, and fourth wire holders forming a wire holder of a wire module according to an exemplary embodiment of the present disclosure.
Figure 5:
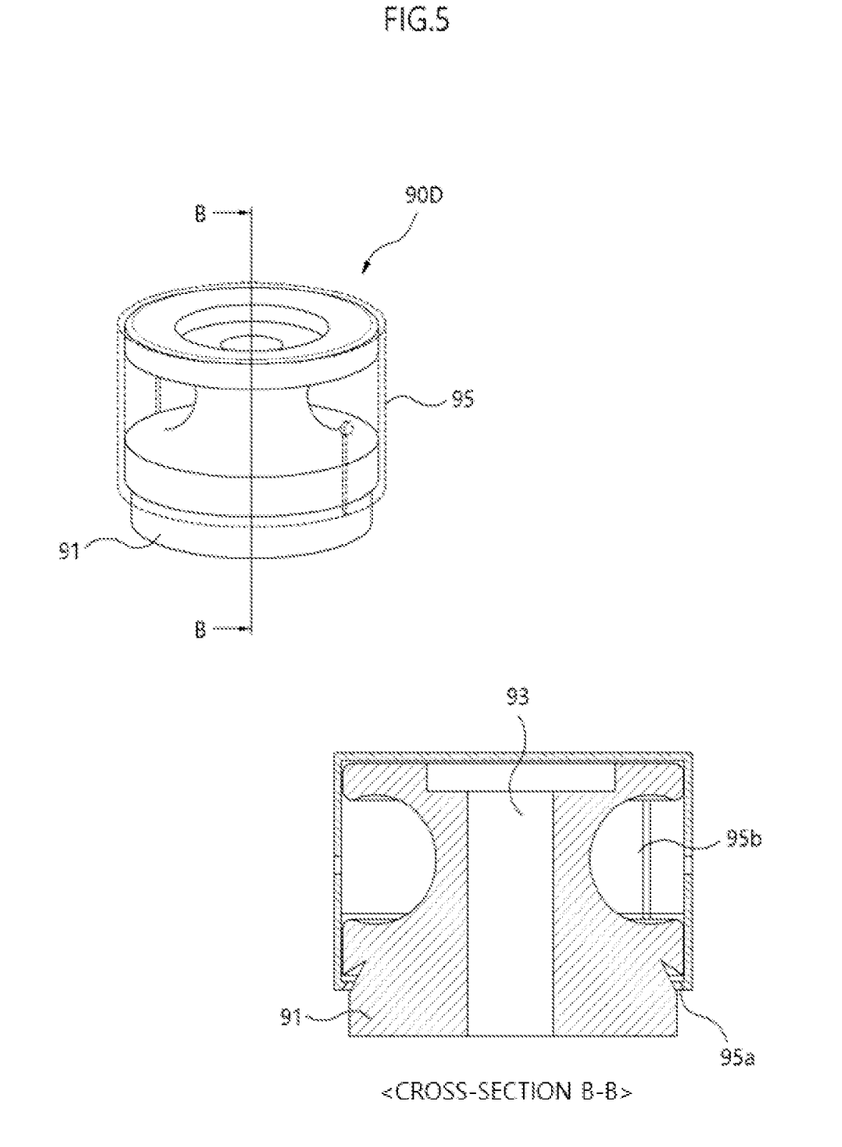
FIG. 5 is a diagram showing a cross-sectional state of the fourth wire holder applied to a final step of the wire holder according to an exemplary embodiment of the present disclosure.

On the other hand, FIG. 4 and FIG. 5 show a specific configuration of the wire holder 90.

Referring to FIG. 4, the wire holder 90 includes four first, second, third, and fourth wire holders 90A, 90B, 90C, and 90D, and the first, second, third, and fourth wire holders 90A, 90B, 90C, and 90D are coupled to the door body of the panoramic door 20 and provided in a half section (i.e., section where the first mounting bracket 60A is located from the second mounting bracket 60B fixing the piston carriage 50) of the panoramic window space 20-1.

For example, the first wire holder 90A of the first, second, third, and fourth wire holders 90A, 90B, 90C, and 90D is coupled to the door body at the location of the second mounting bracket 60B on the bottom portion of the panoramic window space 20-1, the second wire holder 90B is coupled to the door body on one side (i.e., left) of the panoramic window space 20-1 on the bottom portion of the panoramic window space 20-1, the third wire holder 90C is coupled to the door body at the location facing the second wire holder 90B on the top portion of the panoramic window space 20-1, and the fourth wire holder 90D is coupled to the door body at the location facing the first wire holder 90A on the top portion of the panoramic window space 20-1.

For example, each of the first wire holder 90A and the fourth wire holder 90D is equally formed in a bolting type structure and therefore, coupled to the door body of the panoramic door 20 by the fastening of a bolt or a screw.

To the present end, each of the first wire holder 90A and the fourth wire holder 90D is formed of a bolting type body 91 through which an axial hole 93 is perforated. In the instant case, the bolting type body 91 is formed of a cylindrical body forming the intermediate section as an I cross-sectional structure, and the axial hole 93 allows the screw or the bolt, which is screw-fastened to the door body of the panoramic door 20, to penetrate therethrough.

However, the fourth wire holder 90D is coupled to a holder cover 95 of a lid structure surrounding the bolting type body 91, and the holder cover 95 is vertically slit from an inlet of a lid formed with a latching projection 95a up to a predetermined height to form wire slits 95b into which the wire 80 is fitted. In the instant case, the wire slits 95b are formed at locations opposite to each other at 180 degrees, respectively.

For example, each of the second wire holder 90B and the third wire holder 90C is equally formed in a fastener type structure and therefore, fitted into and coupled to a door body hole perforated in the door body of the panoramic door 20.

To the present end, each of the second wire holder 90B and the third wire holder 90C is formed of a fastener type body 92 through which the axial hole 93 is perforated. In the instant case, the fastener type body 92 is formed of a conical body forming the intermediate section as the I cross-sectional structure, and the axial hole 93 elastically deforms a lower conical portion of the fastener type body 92 more largely.

FIG. 5 shows that the coupling structure of the fourth wire holder 90D and the holder cover 95 is formed by latching and fixing the holder cover 95 to a protrusion of the bolting type body 91 with the latching projection 95a having the circular shape on the inlet thereof to be fixed by surrounding the fourth wire holder 90D using the lid structure.

Meanwhile, FIG. 6 and FIG. 7 show a setting arrangement state where the wire 80 utilizes the piston carriage 50 and the first, second, third, and fourth wire holders 90A, 90B, 90C, and 90D. In the instant case, the wire 80 exits the piston carriage 50 through the wire drawn-out path and then is supported by the first, second, third, and fourth wire holders 90A, 90B, 90C, and 90D through the wire installation path to form a pre-operation state.

Referring to FIG. 6, the wire drawn-out path of the wire 80 is formed in an order of the piston movement space 51 of the piston carriage 50→the wire clamp 80-1→the piston 57→the wire guide 55. In the instant case, the "→" refers to the order of the proceeding procedure.

For example, the wire 80 is formed to enter the piston movement space 51 of the piston carriage 50, to exit to the pressure chamber 53 through the wire hole 57c in a state where the location of the wire 80 is fixed to the wire clamp 80-1 located in the piston groove 57b of the piston 57 in the piston movement space 51, to penetrate the chamber partition wall 53c of the pressure chamber 53 to enter the expansion chamber 53b, and then to be drawn out to the wire guide 55 to exit the piston carriage 50.

As the wire clamp 80-1, an axial wire clamp 80-1A or a circumferential wire clamp 80-1B is applied depending upon the structure of the piston groove 57b of the piston 57. In the instant case, the axial wire clamp 80-1A and the circumferential wire clamp 80-1B have the same structure as the general structure of the clamp.

Referring to FIG. 7, the wire installation path of the wire 80 is formed in an order of the first wire holder 90A→the second wire holder 90B→the third wire holder 90C→the fourth wire holder 90D→the holder cover 95. In the instant case, the "→" refers to the order of the proceeding procedure.

For example, the wire 80 is completely provided by pulling the wire 80 backward to be drawn out at an appropriate length from the wire guide 55 of the piston carriage 50 to be latched to the I cross-sectional structure of the bolting type body 91 outside the first wire holder 90A, then pulling the wire 80 forward to be latched to the I cross-sectional structure of the fastener type body 92 inside the second wire holder 90B, and continuously, pulling the wire 80 upward to be latched to the I cross-sectional structure of the fastener type body 92 inside the third wire holder 90C, then pulling the wire 80 backward to latch the ring structure of the wire end portion 80A to the I cross-sectional structure of the fourth wire holder 90D, and then pressing the holder cover 95 in a state of fitting the wire slit 95b of the holder cover 95 into the wire 80 to fix the holder cover 95 to the bolting type body 91 of the fourth wire holder 90D with the latching projection 95a.

Finally, the piston stopper 50A is formed by narrowing the inlet portion of the open structure of the piston carriage 50 using a compression tool 50-1. In the instant case, the piston stopper 50A slightly reduces the diameter of the piston movement space 51 to be formed in a piston latching structure and therefore, the piston 57 forms the friction force by the piston carriage 50 when the first and second inflators 40A, 40B explode. Even when the piston stopper 50A is damaged by the piston 57, the piston stopper 50A fixes the partially separated piston 57 to the piston carriage 50 itself so that the reaction force may be generated.

As described above, the first wire holder 90A, the second wire holder 90B, the third wire holder 90C, and the fourth wire holder 90D are arranged on one side (i.e., left) of the rectangular shape of the panoramic window space 20-1 in the "⌐" shape (or side bending shape) and therefore, the wire 80 latched thereto to maintain the constant tension is also arranged in the "⌐" shape (or side bending shape).

Figure 8:
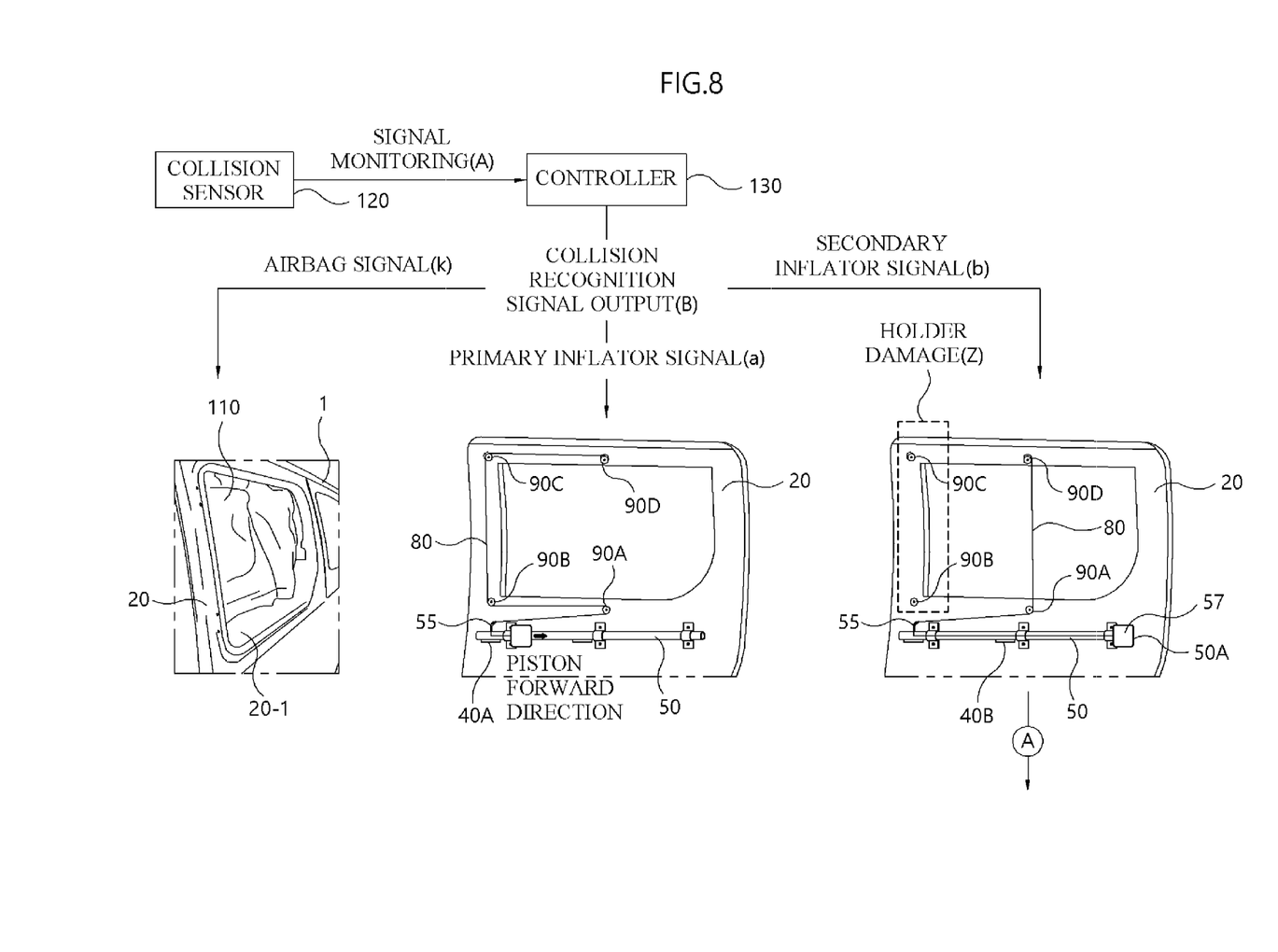
FIG. 8 and FIG. 9 are diagrams showing a state where a panoramic window safety system is operated in a vehicle under a control of a controller upon collision of the vehicle according to an exemplary embodiment of the present disclosure.
Figure 9:
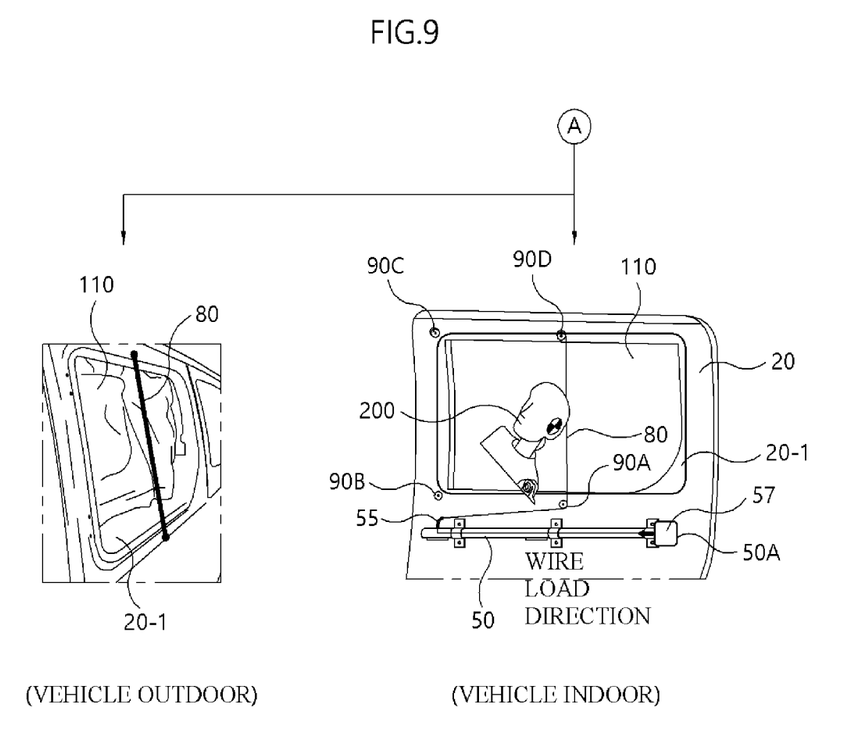

Meanwhile, FIG. 8 and FIG. 9 show operation states where the controller 130 controls the panoramic window safety system 1-1 in conjunction with the airbag system 100 in the collision situation of the vehicle 1.

Referring to FIG. 8, when confirming the pulse generation of the collision detector 120 while monitoring the collision detector 120 using the logic or the program, the controller 130 generates the secondary inflator signal (b) about 2 ms after generating the primary inflator signal (a) according to the same timing as that of the time to fire (TTF) of the CAB which is the airbag signal (k) deploying the airbag 110.

Accordingly, the first inflator 40A explodes with the primary inflator signal (a) generated according to the same timing as that of the time to fire (TTF) of the CAB which is the airbag signal (k) deploying the airbag 110 under the control of the controller 130, and the gas pressure of the first inflator 40A increases the pressure in the pressure chamber 53 of the piston stopper 50A.

Furthermore, the second inflator 40B explodes with the secondary inflator signal (b) generated about 2 ms after the primary inflator signal (a) is output, and the gas pressure of the second inflator 40B increases the pressure in the piston movement space 51 of the piston stopper 50A.

As described above, the first and second inflators 40A, 40B are controlled by the sequential explosion that the first inflator 40A first explodes with the primary inflator signal (a) of the controller 130 and then the second inflator 40B explodes with the secondary inflator signal (b) later.

Therefore, the first and second inflators 40A, 40B sequentially generate the gas pressures with time difference to continuously induce the forward motion of the piston 57 in the piston movement space 51 of the piston carriage 50.

Finally, the wire 80 is pulled by the piston 57 moved by the explosion of the first and second inflators 40A, 40B and therefore, the " ⌐ " shape arrangement (or side bending arrangement) is switched into a state where the tension of the wire increases by a strong force, and as the tension of the wire increases, the wire 80 is pulled from inside to outside and therefore, the second and third wire holders 90B, 90C with the wire 80 located therein are damaged by a strong pulling force of the wire 80 whereas the first and fourth wire holder 90A, 90D with the wire 80 located outside are not damaged and maintained in the fixed states.

Referring to FIG. 9, since the wire 80 is in a state where the ring structure of the wire end portion 80A is fixed to the fourth wire holder 90D, the " ⌐ " shape arrangement (or side bending arrangement) is switched into the "I" shape arrangement (or intermediate linear arrangement), and the wire 80 forms the vertical longitudinal line of the "I" shape arrangement (or intermediate linear arrangement) in the panoramic window space 20-1 of the panoramic door 20 like "a vehicle outdoor state."

As a result, the airbag 110 receives the shock applied by the passenger 200 like "a vehicle indoor state" in a state of being inflated to cover the panoramic window space 20-1 of the panoramic door 20, but the outside of the airbag 110 is supported by the wire 80 of the "I" shape arrangement (or intermediate linear arrangement) and therefore, the airbag 110 can prevent the excessive passenger leaving load, restricting the passenger.

As described above, the panoramic window safety system 1-1 switches the wire 80 from the " ⌐ " shape arrangement (or side bending arrangement) into the "I" shape arrangement (or intermediate linear arrangement) to induce the generation of the passenger leaving load reaction force at which the airbag 110 (i.e., CAB) of the airbag system 100 can prevent the passenger from leaving due to the collision.

As described above, the panoramic window safety system 1-1 applied to the vehicle 1 according to the exemplary embodiment of the present disclosure can move the piston 57 in the piston movement space 51 of the piston carriage 50 by the gas pressure of the inflator 40 located on the bottom portion of the panoramic window space 20-1 formed in the panoramic door 20, and switch the wire 80 that forms the side bending arrangement in the panoramic window space 20-1 into the intermediate linear arrangement due to the forward movement of the piston 57 to be stood perpendicular to the panoramic window space 20-1 to support the airbag 110 covering the panoramic window space 20-1, preventing the risk of the passenger leaving when the panoramic window 10 including the size at which the upper body of the passenger 200 is exposed is damaged to meet the North American regulations that prescribe preventing the passenger from leaving, and it is possible to protect the passenger using the CAB and the SAB even in the panoramic window by preventing the risk of the passenger 200 leaving through the passenger leaving load reaction force generated by the CAB of the airbag 110.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the control device may be implemented in a form of hardware or software, or may be implemented in a combination of hardware and software.

Furthermore, the terms such as "unit", "module", etc. Included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A panoramic window safety system comprising:
   a panoramic door formed with a panoramic window space;
   an inflator module provided with an inflator located on a bottom portion of the panoramic window space; and
   a wire module provided with a wire which is located on one side of the panoramic window space in a side bending arrangement, and provided perpendicular to the panoramic window space by switching of the side bending arrangement into an intermediate linear arrangement by a gas pressure of the inflator,
   wherein the inflator is connected to a controller, and
   wherein the controller is configured to control the inflator with a first inflator signal according to a time to fire (TTF) of an airbag and a second inflator signal after a timing of the TTF.

2. The panoramic window safety system of claim 1, wherein the wire is a steel wire or a wire including a material that withstands a predetermined temperature of 700° C. or more than the predetermined temperature.

3. The panoramic window safety system of claim 1, wherein the inflator module includes:
   a piston carriage configured to communicate the inflator in a hollow structure of a piston movement space, to move a piston fixing the wire in the piston movement space by the gas pressure, and to pull the wire by the movement of the piston to switch the side bending arrangement into the intermediate linear arrangement; and
   a mounting bracket fixing the piston carriage to the panoramic door.

4. The panoramic window safety system of claim 3, wherein the piston carriage forms a pressure chamber in which the piston movement space of the piston carriage is partitioned at a front location of the piston, and
   wherein the inflator includes a first inflator configured to communicate with the pressure chamber at the front location of the piston, and a second inflator configured to communicate with the piston movement space at a rear location of the piston.

5. The panoramic window safety system of claim 4, wherein the first inflator and the second inflator explode with time difference therebetween to generate the gas pressure of the first inflator and the second inflator, respectively.

6. The panoramic window safety system of claim 4, wherein the pressure chamber is provided with a chamber partition wall configured to block a gas from backflowing due to the explosion of the first inflator.

7. The panoramic window safety system of claim 6, wherein the chamber partition wall is formed to be slanted with respect to a longitudinal axis of the piston carriage in the piston movement space of the piston carriage.

8. The panoramic window safety system of claim 4, wherein the piston carriage is provided with a wire guide through which the wire exits, and
   wherein the wire guide communicates with an expansion chamber formed in front of a chamber partition wall partitioning the pressure chamber, and forms a path through which the wire exiting the piston to pass through the chamber partition wall exits.

9. The panoramic window safety system of claim 3, wherein a wire hole configured to penetrate the wire is perforated in the piston.

10. The panoramic window safety system of claim 1, wherein the wire module includes a wire holder configured to support the wire, and
    wherein the wire holder is formed in the side bending arrangement in a half section of the panoramic window space in combination of a first wire holder, a second wire holder, a third wire holder, and a fourth wire holder.

11. The panoramic window safety system of claim 10, wherein each of the first wire holder and the fourth wire holder is fixed to the panoramic door in a bolting fastening structure, and
    wherein each of the second wire holder and the third wire holder is fixed to the panoramic door in a fastener fitting structure.

12. The panoramic window safety system of claim 10, wherein the first wire holder and the fourth wire holder face each other and are arranged on a top portion and a bottom portion of the panoramic window space at an intermediate location of the panoramic window space, and
    wherein the second wire holder and the third wire holder face each other and are arranged on the top portion and the bottom portion of the panoramic window space at on an external location of the panoramic window space.

13. The panoramic window safety system of claim 12, wherein the second wire holder and the third wire holder are damaged by movement of the wire due to the gas pressure in a state where the wire is fixed to the fourth wire holder, and wherein the first wire holder and the fourth wire holder maintain the wire in the intermediate linear arrangement.

14. The panoramic window safety system of claim 13, wherein the fourth wire holder and the wire are fixed by a wire end portion, and
wherein the wire end portion is latched to a bolting type body of the fourth wire holder with a ring structure.

15. The panoramic window safety system of claim 14, wherein the fourth wire holder is surrounded by a holder cover.

16. The panoramic window safety system of claim 1, wherein the airbag is deployed to the panoramic window space, and
wherein the wire generates a passenger leaving load reaction force for the airbag in the intermediate linear arrangement between the airbag and the panoramic window space.

17. A vehicle comprising:
a panoramic door formed with a panoramic window space to which a panoramic window is coupled;
an airbag deployed toward the panoramic window upon collision of the vehicle;
a panoramic window safety system configured to move a piston in a piston movement space of a piston carriage by gas pressures of a first inflator and a second inflator located on a bottom portion of the panoramic window space, and to switch a wire that forms a side bending arrangement in the panoramic window space into an intermediate linear arrangement by a forward movement of the piston to be provided perpendicular to the panoramic window space to support the airbag covering the panoramic window space; and
a controller configured to monitor a collision signal of a collision detector and to control explosion of the first inflator and the second inflator with time difference of the timing when confirming the collision signal.

18. The vehicle of claim 17,
wherein the time difference of the timing is based on a time to fire (TTF) of the airbag, and
wherein the first inflator applies a same timing as a timing of the TTF, and the second inflator applies a delay timing after the timing of the TTF.

19. The vehicle of claim 17,
wherein the airbag is a curtain airbag (CAB) or a side airbag (SAB).

* * * * *